Figure 1:
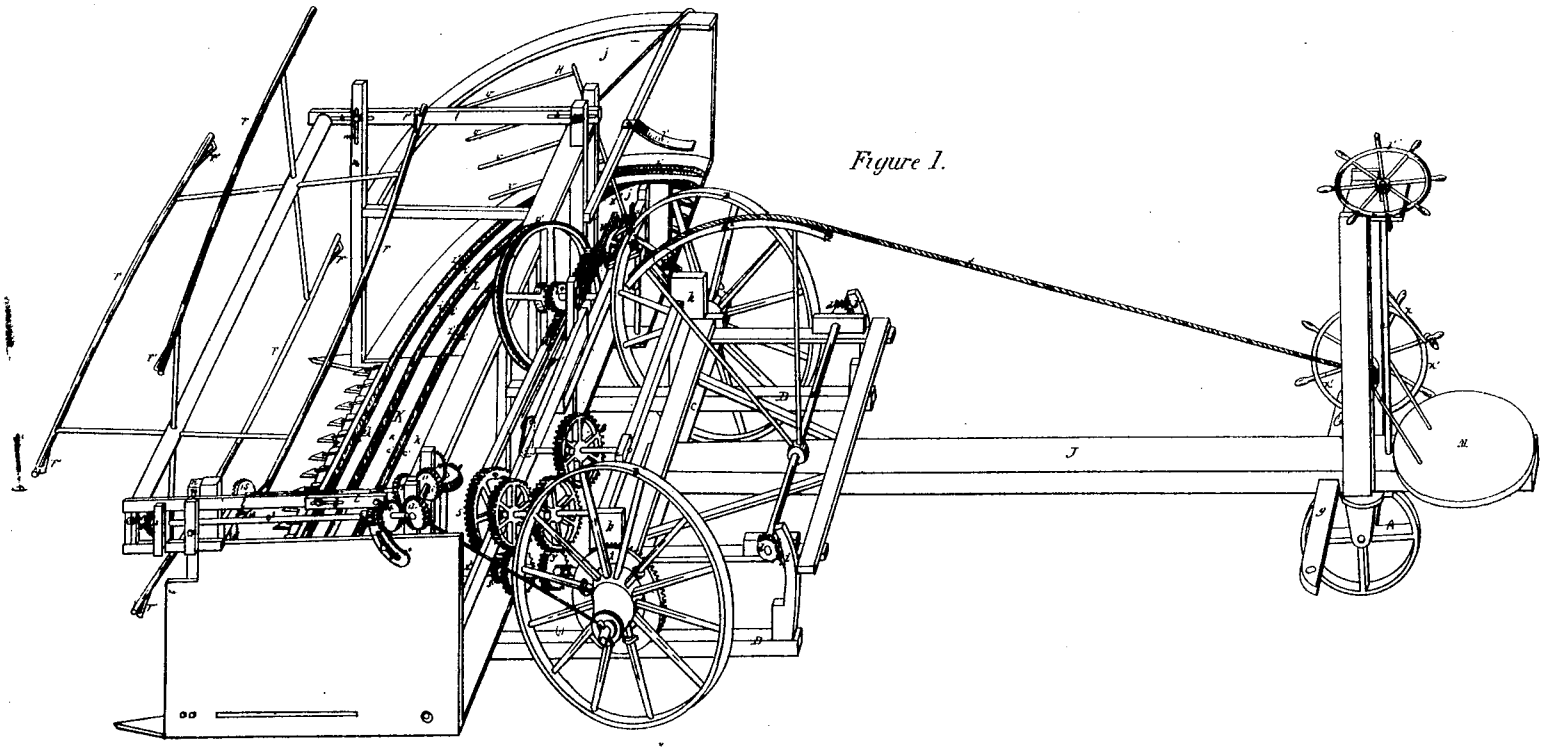

SS- HARVESTERS.
154

DRAFTSMAN.

Hay Cancel

Sheet 1. 5 Sheets

N. Platt.

Mower.

No 590 Reissued Aug. 31, 1858.

DRAFTSMAN.
157
Sheet 2. 3 Sheets
N. Platt.
Mower.
No. 590
Reissued Aug. 31, 1858.
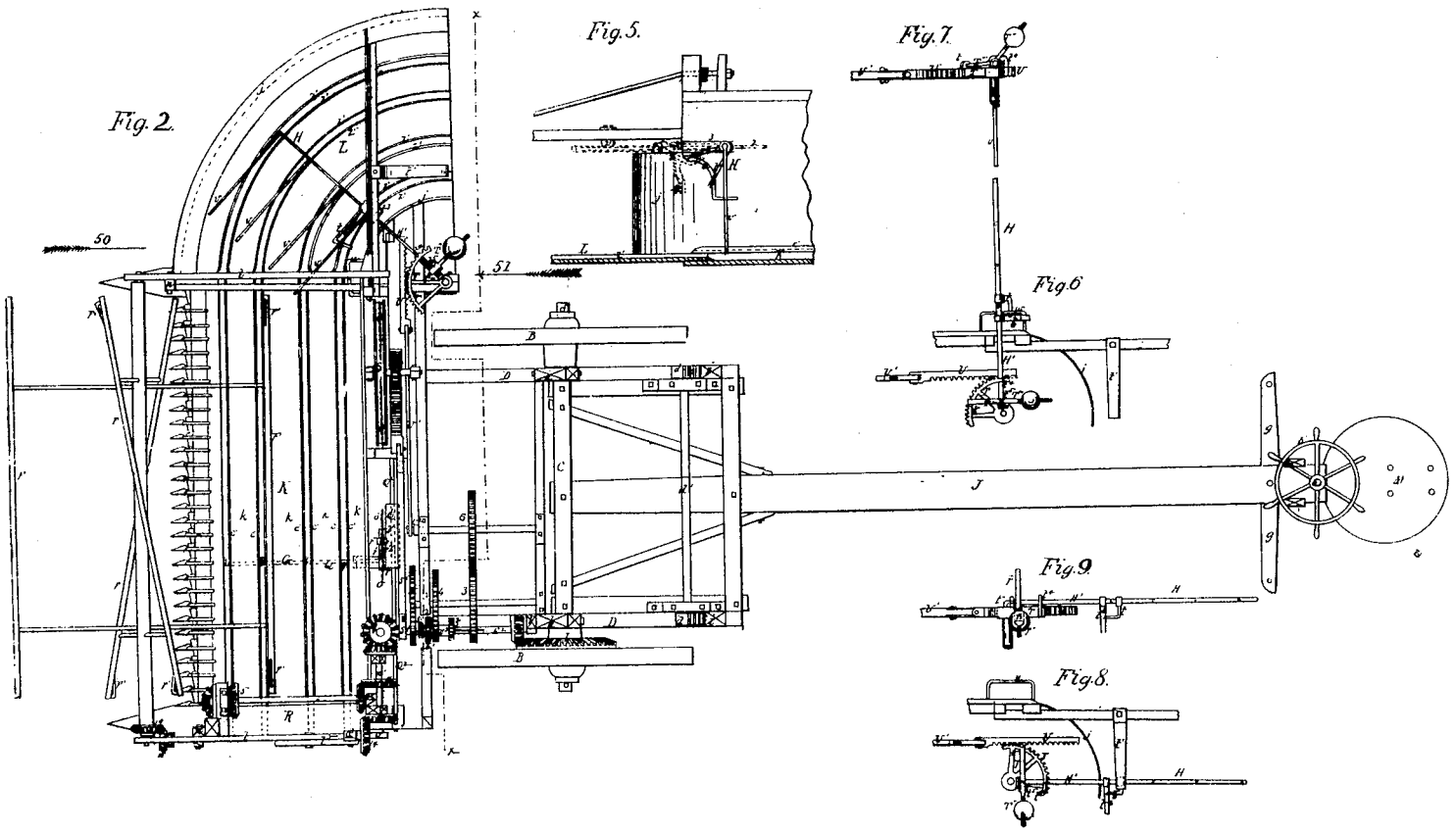

DRAFTSMAN.
3rd Sheet-3 Sheets.
N. Platt.
Mower.
№ 590
Reissued Aug. 31, 1858.
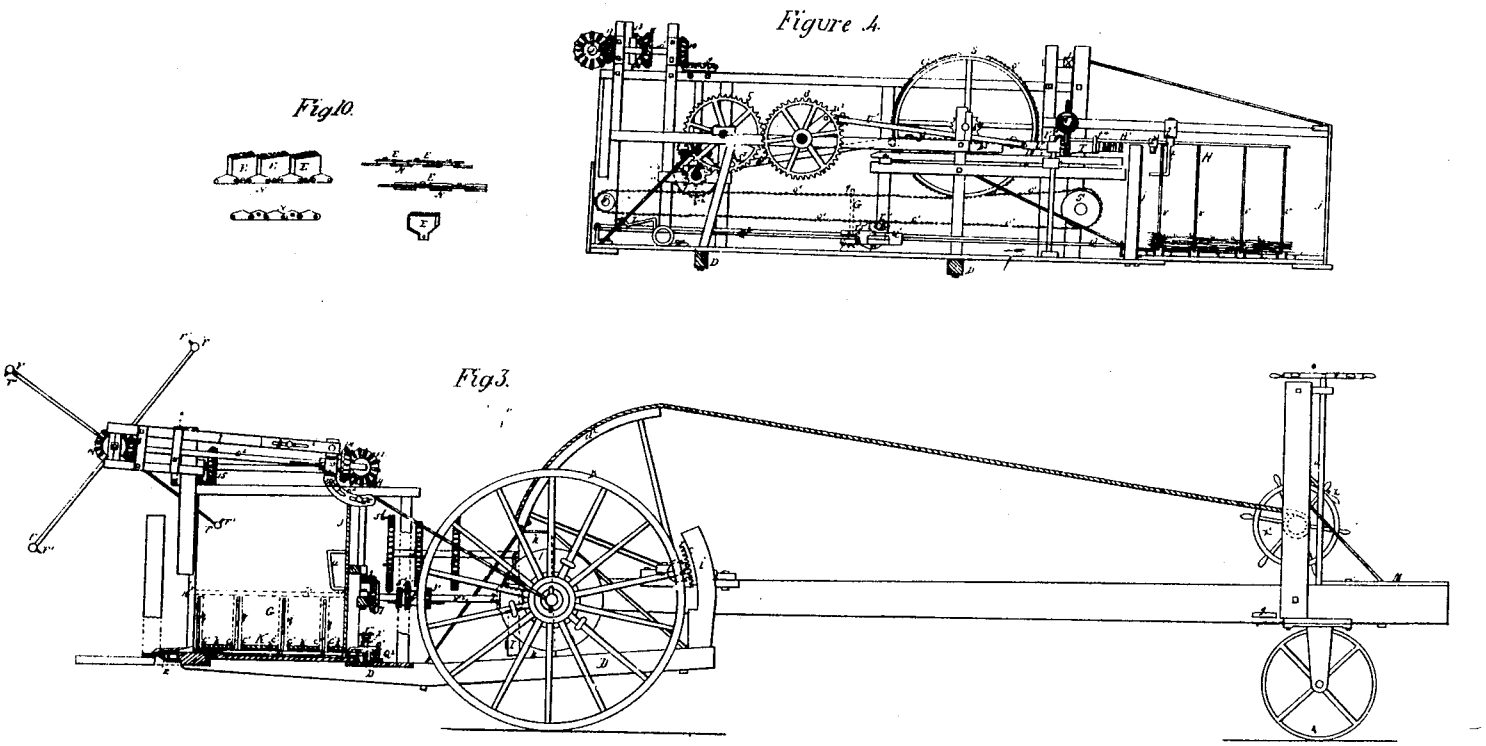

UNITED STATES PATENT OFFICE.

W. H. SEYMOUR AND D. S. MORGAN, OF BROCKPORT, NEW YORK, ASSIGNEES OF N. PLATT.

IMPROVEMENT IN HARVESTERS.

Specification forming part of Letters Patent No. 6,517, dated June 12, 1849; Reissue No. 265, dated May 23, 1854; Reissue No. 590, dated August 31, 1858.

DIVISION A.

*To all whom it may concern:*

Be it known that NELSON PLATT, formerly of Ottawa, in the county of La Salle and State of Illinois, late of Kendall county, in the same State, (assignor to WILLIAM H. SEYMOUR and DAYTON S. MORGAN, of Brockport, in the county of Monroe and State of New York,) did invent certain new and useful Improvements in Machines for Cutting and Raking Grain or Grass, of which the following is a full, clear, and exact description, reference being had to the accompanying drawings, which make part of this specification, and in which—

Figure 1 represents a view in perspective, and Fig. 2 a plan or top view, of a machine embracing the said improvements. Fig. 3 represents an elevation of that side of the machine which runs next to the uncut grain, a portion of the frame being removed to expose a part of the raking mechanism and cutting apparatus. Fig. 4 represents an elevation (seen from the rear) of that part of the machine which is in front of a vertical plane shown by the dotted line *x x* of Fig. 2. Figs. 5, 6, 7, 8, and 9 represent the sweep or oscillating rake and part of the mechanism for working it in different attitudes and positions, Fig. 5 representing an elevation inside the platform, (seen in the direction of the arrow 50,) Fig. 6 representing a plan when the rake has the position shown by the black lines in Fig. 5, Fig. 8 representing a plan when the rake has another position, and Figs. 7 and 9 representing elevations (seen in the direction of the arrow 51) with the rake in two different positions; and Fig. 10 represents side and edge views of the chain and cutters.

The machine is to be drawn by horses walking on each side of a beam, J, to which they are connected in the usual manner by whiffletrees. Under the rear end of this beam is a guide-wheel, A, capable of being turned in any required direction by means of a vertical shaft, *a*, having upon its upper end a steering-wheel, *b'*. Upon the rear end of the beam J is placed a stand, M, for the attendant who drives the horses, guides the machine, and by means of a hand-wheel, *x'*, which can be held in any required position by a pawl, *x*, raises or lowers the platform, cutting apparatus, &c. The beam J is connected in front of the space for the horses with the axle C of the two carrying-wheels B B. This beam also carries a frame which supports a rock-shaft, *d'*, with pinions *d d* on its ends, operated by the quadrant-lever $d^2$, cord *f*, and hand-wheel *x'*.

The platform, cutting apparatus, reel, raking mechanism, &c., are attached to two horizontal beams, D D, which are suspended from the axle C by two vertical pieces, *h h*. These beams D D carry studs *i i*, to which are attached curved racks *c c*, into which the pinions *d d* gear, and when operated by the above-described mechanism raise or lower the platform, cutting apparatus, &c., the whole turning upon the axle C as a center or fulcrum.

Motion is communicated to the cutters, reel, and raking mechanism by a bevel-wheel, 1, upon one of the carrying-wheels B, which also acts as a driving-wheel. This bevel-wheel engages with a bevel-pinion, 2, driving a shaft, $v^2$, having upon its front end a bevel-wheel, 7, which, by means of a train of bevel-wheels, 8, 9, and 10, and their respective shafts, drives a shaft, 10', carrying, besides the bevel-wheel 10, two other bevel-wheels, 11 and 12. From one, 11, of these motion is communicated by bevel-wheels 13 and 15 to a wheel, 16, on a vertical shaft, 16', upon the lower end of which is secured a pulley that drives the endless chain N and the cutters attached thereto. This endless chain N, passing around the above-mentioned pulley on one side and around a corresponding pulley on the the other side, revolves within the double platform K, and carries the cutters E E, which may be fastened to it by rivets, as represented, or by any other suitable means. Motion is given to the reel from the bevel-wheel 12 by a train of bevel-wheels, 14, 18, and 19, the last of which, 19, is upon the axis of the reel.

In order to suit different heights of grain, the reel may be raised or lowered and thrown backward or forward by means of slots *m* in the vertical posts *n n* and slots *b* in the horizontal pieces *l*. Through these slots clamp-screws are passed, which secure the reel in the position required.

In order to prevent a change in the position of the reel from interfering with the operation of the gearing, the shaft $o^2$ (which, by reason of its length and position, would otherwise obstruct such adjustment) is supported in a collar, $o^3$, attached to the frame by a standard, $o^4$, with a slot, $o^5$, in it curved in an arc whose center is the center of the wheel which turns the shaft $o^2$. A bolt passing through the slot $o^5$ admits of the standards being secured in any required position to adapt it to the height of the reel. The shaft $o^2$ is made to slide through the eye of the hinder bevel-wheel, 14, which is prevented from turning loosely upon the shaft by a feather.

The vanes F F of the reel are inclined to planes passing through its axis, and to prevent the grain from slipping past their ends they are provided with wedges or hooks F′ F′.

The shaft $v^2$, which derives its motion from the driving-wheel, carries a sliding sleeve, $v^3$, which is prevented from turning upon the shaft by a feather and groove, and upon which are three pinions, 3′, 4′, and 5′, which, being of unequal size and gearing respectively with three wheels, 3, 4, and 5, allow different rates of motion to be communicated to the raking mechanism, so that the size of the sheaves of cut grain may be varied at pleasure. This sleeve $v^3$ may be shifted by a clutch-lever or by hand, to bring into gear any one of the pinions required. Whichever of them may be thus brought into gear the corresponding wheel, 3, 4, or 5, by a crank-pin, $s^7$, on it, gives, by means of a pitman, $s^5$, a reciprocating motion to a rack, $s^3$, and thence to a pinion, $s^4$, on a drum, S. To this drum are fastened the ends of a chain, $o'$, which passes around and over two pulleys, S′ S′. To this chain is attached an arm, $r''$, upon a quadrant-pinion, $r'$, mounted in a sliding stock, Q′, which is, by the reciprocating motion of the drum, carried back and forth upon a guide-rod, $Q^2$. This sliding stock carries the head Q of the rake G, which moves within the double platform K, through slots in the upper floor of which the teeth $q$ of the rake can rise to a vertical position when they are to draw off the grain. Upon the head Q of the rake G is a pinion, $r$, which gears into the quadrant-pinion $r'$. The arm $r''$ and the quadrant are so arranged that when the rake is to be drawn backward the pinion $r$ is revolved through an arc of about ninety degrees, and the teeth $q$ of the rake are thrown into a horizontal position, and so pass back beneath the grain, when they are again raised to a vertical position to move forward. In order to prevent the further rotation of the quadrant $r'$ when the teeth of the rake are either vertical or horizontal, two stop-pins, 2′ 2′, are arranged upon the quadrant so that they alternately strike upon the sliding stock when the teeth are in the proper position. If the teeth of the rake, when rising to a vertical position, were covered by the grain, its weight would oppose an inconvenient resistance. To obviate this difficulty the teeth rise beneath a box or cover, which prevents the grain from resting upon them, and in order that they may not come out of the box (through the slots provided for their passage) before they have fully attained their vertical position a spring, $z$, (seen in Fig. 4,) is so arranged that it catches upon a shallow notch in the top of the sliding stock when it is ready to return and holds it with sufficient force to keep it from moving on the guide-rod until the quadrant $r'$ and pinion $r$ have brought the teeth into a vertical position.

In describing the raking mechanism the terms "backward" and "forward" refer to the course of the grain on its way to be delivered on the ground.

The sweep or vibrating rake H receives its motion from one, 3, of the three wheels which have already been mentioned in connection with the shifting-gear. This wheel engages with another wheel, $b$, which, by means of a crank-pin, $u^2$, and pitman U′, gives a reciprocating motion to the rack U, gearing into a quadrant, T, which carries a lever, H′, prolonged to form the head of the rake H. This lever is so arranged as to be susceptible of partial rotation upon its axis.

Upon the lever H′, and at right angles to it, is secured a weighted lever or tumbler, T″, which, when the head of the rake is free to turn on its axis, brings the teeth $v$ $v$ $v$ into a horizontal position, as shown in Figs. 1, 2, and 9, and also in red in Fig. 5, and retains them in this position while the rake is carried back by the rack and quadrant to the point at which it is required to turn the teeth down again into a vertical position behind the grain to be discharged from the platform. A stop, $t^5$, is placed on the quadrant beneath the tumbler T″ to prevent it from descending lower than is necessary for bringing the teeth into a horizontal position. Upon the rake-head are fastened two arms or levers, $t$ $t^3$, which are so arranged in relation to the teeth that when the rake is carried backward one of them, $t$, at its bent end comes in contact with a stop or guide, $u$, just at the point where it is necessary that the teeth of the rake shall resume their vertical position to seize the grain, as seen in red in Fig. 5. The further backward motion of the rake (the arm $t$ bearing against the guide $u$) causes the rake-head to rotate upon its axis sufficiently to bring the teeth into a vertical position, when the other arm, $t^3$, slides horizontally over the top of the guide, as is shown in black in Figs. 5 and 6. Another arm, T‴, acting as a latch, projects from the lever H′ (prolonged to form the head of the rake H) in a direction opposite to the tumbler T″ and nearly at right angles to the plane of the teeth $v$ of the rake H, as seen in Figs. 6, 7, 8, and 9. When the teeth are brought into a vertical position, in the manner above described, this last-named arm or latch, T‴, is brought down in front of a catch or hook, $t''$, upon the quadrant T, as shown in Fig. 6. When the quadrant again commences to move forward the arm $t^3$, moving horizontally over the guide $u$, still holds the teeth vertical, while the staple or slot $t^4$, being wider than the lever H, moves over the latter a short distance to bring the catch $t''$ over the latch T‴, which then lies in

United States Patent Office

PTO - BOYERS, PA Duty Station

MISSING PAGE TEMPORARY NOTICE

PATENT # RE 590 FOR ISSUE DATE 8-31-1858

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

page 3 and rest of description

D/A
at Boyers
11-3-1992

Data Conversion Operation

Boyers, Pa

No. 590.—*Improvement in Harvesters.*—What is claimed as the invention of Nelson Platt, is:

First. Combining with a machine for cutting grain and gathering upon a platform a raking mechanism which at suitable intervals sweeps the grain off the platform, changes the direction of its stalks relative to the path of the machine, and discharges it upon the ground in gavels, substantially as herein set forth.

Second. The employment of a sweep or vibrating rake, operating in such manner that while sweeping the grain off the platform and discharging it upon the ground, it will change the direction of the stalks, as described.

Third. The method of vibrating a sweep-rake and turning its teeth in such a manner that they will pass over the grain, points foremost, at intervals to reach back and seize the grain and sweep it off the platform, whether the devices employed to effect the movements be such as described or others equivalent thereto.

Fourth. The method of holding a sweep-rake firmly while raking the grain with the points of its teeth in the proper position, relative to the platform, by means of a latch or other equivalent thereto, which, operating with a greater certainty than a weight, spring, or other fastening not rigid, more effectually prevents the rake-teeth from rising to override the grain, and at the same time avoids the necessity of moving a heavy weight, or of overcoming the tension of a strong spring in elevating the rake preparatory to its retrograde stroke.

Fifth. The construction and arrangement of a sweep-rake, and the mechanism for operating it, in such a manner that it is carried back and forth, and its teeth raised and lowered without support at the outer end.

Sixth. Changing the frequency of the alterations of the raking mechanism by means of the shifting gear or other equivalent devices for producing a varying rate of motion, for the purpose of varying the size of the sheaves as may be required, substantially as set forth.

WILLIAM H. SEYMOUR.
D. S. MORGAN.